United States Patent [19]
Artaud et al.

[11] Patent Number: 4,578,238
[45] Date of Patent: Mar. 25, 1986

[54] FAST NEUTRON NUCLEAR REACTOR

[75] Inventors: Robert Artaud, Aix-en-Provence; Michel Aubert, Manosque; Charley Renaux, Jouques, all of France

[73] Assignee: Commissariat a l'Energie Atomique, Paris, France

[21] Appl. No.: 576,195

[22] Filed: Feb. 2, 1984

[30] Foreign Application Priority Data

Feb. 22, 1983 [FR] France ................... 83 02859

[51] Int. Cl.⁴ .................................... G21C 1/02
[52] U.S. Cl. ........................... 376/404; 376/461; 376/290; 376/294
[58] Field of Search .......... 376/402, 403, 404, 405, 376/461, 290, 294

[56] References Cited

U.S. PATENT DOCUMENTS

| | | | |
|---|---|---|---|
| 3,149,043 | 9/1964 | Goldstein et al. | 376/403 |
| 3,784,443 | 1/1974 | Vercasson | 376/290 |
| 4,087,325 | 5/1978 | Chevallier et al. | 376/405 |
| 4,225,389 | 9/1980 | Howard et al. | 376/290 |
| 4,351,794 | 9/1982 | Artaud et al. | 376/405 |
| 4,366,854 | 1/1983 | Artaud et al. | 376/405 |

FOREIGN PATENT DOCUMENTS

| | | | |
|---|---|---|---|
| 0746863 | 5/1970 | Belgium | 376/290 |
| 2430191 | 1/1975 | Fed. Rep. of Germany . | |
| 2535378 | 2/1977 | Fed. Rep. of Germany . | |
| 2150627 | 4/1973 | France . | |
| 2090042 | 6/1982 | United Kingdom . | |

*Primary Examiner*—Harvey E. Behrend
*Assistant Examiner*—Richard W. Wendtland

[57] ABSTRACT

Liquid metal-cooled nuclear reactor incorporating a main vessel sealed by a slab and containing the reactor core, an inner vessel placed within the main vessel and defining in the latter a hot zone filled with relatively hot liquid metal and a cold zone filled with relatively cold liquid metal, at least one pump for circulating the liquid metal between the cold zone and the hot zone across the core and at least one heat exchanger disposed between the hot zone and the cold zone, wherein the inner vessel comprises two truncated cone-shaped ferrules opposed by their large bases and a small diameter cylindrical ferrule extending the small base of the upper truncated cone-shaped ferrule, the reactor core resting on the small base of the lower truncated cone-shaped ferrule by means of a support structure, the hot zone being formed within the inner vessel, while the cold zone is formed between the main vessel and the inner vessel.

18 Claims, 10 Drawing Figures

FAST NEUTRON NUCLEAR REACTOR

BACKGROUND OF THE INVENTION

The present invention relates to a fast neutron nuclear reactor cooled by a liquid metal such as sodium, and of the integrated type, in which the primary circuit is contained in the main vessel sealed by a slab.

More specifically, integrated fast neutron nuclear reactors are characterized by the fact that the main vessel contains the reactor core, an inner vessel defining within the main vessel a hot zone filled with relatively hot liquid metal and a cold zone filled with relatively cold liquid metal, at least one pump for circulating the liquid metal between the cold zone and the hot zone across the core and at least one heat exchanger located between the hot and cold zones. Two versions have been proposed for the inner vessel of integrated reactors, such as the Super-Phénix.

The so-called stepped inner vessel described in French Patent Application Nos. 7,308,075 and 7,536,226 by the Applicant Company is the solution used by the Super-Phénix. The step member separates the hot sodium and the cold sodium between the exchanger inlet and outlet and the main vessel is protected by a thermal baffle. This complex structure is very costly, because it requires a large amount of nuclear quality stainless steel.

Another solution consists of confining the hot sodium within a cylindrical vessel having a diameter substantially equal to that of the core and as proposed in French Patent Applications Nos. 7,539,982 and 7,908,793 by the Applicant Company. The hot sodium must then be brought into the exchanger intake by a tight pipe. This pipe and the ferrules ensuring the sealing of this connection are subject to mechanical and thermal stresses, which make their manufacture particularly difficult. To overcome this problem, it is e.g. necessary to duplicate the inner vessel by a baffle leading once again to the disadvantage of the stepped solution.

Another disadvantage common to both internal vessel types is that there are non-negligible heat leaks to the reactor slab as a result of the size of the free hot sodium surface compared with that of the cold sodium.

SUMMARY OF THE INVENTION

The present invention relates to an integrated fast neutron nuclear reactor not suffering the disadvantages of the known reactors and more particularly characterized by a considerable weight gain, considerable simplicity and easy construction, these three combined elements leading to a significant reduction in the costs of the installation.

Thus, according to the invention, a liquid metal-cooled nuclear reactor of the type described hereinbefore, characterized in that the inner vessel comprises two truncated cone-shaped ferrules opposed by their large bases and a small diameter cylindrical ferrule extending the small base of the upper truncated cone-shaped ferrule, the reactor core resting on the small base of the lower truncated cone-shaped ferrule by means of a support structure, the hot zone being formed within the inner vessel, whilst the cold zone is formed between the main vessel and the inner vessel.

According to a first embodiment, the two truncated cone-shaped ferrules are directly interconnected in the vicinity of their large bases.

According to another embodiment, the two truncated cone-shaped ferrules are connected along their large bases, either directly, or by means of a cylindrical ferrule.

These characteristics of the inner vessel correspond to a relatively simple shape which is easy to realise. Moreover, compared with the prior art, they make it possible to eliminate the baffles duplicating the main vessel and the pipes connecting the inner vessel to the exchangers.

In the case where the two truncated cone-shaped ferrules are directly interconnected in the vicinity of their large bases, the inner vessel is fixed to the main vessel along the large base of the truncated cone-shaped ferrule to which is fixed the other truncated cone-shaped ferrule.

In the case where the two ferrules are connected along their large base and according to a variant of the invention, the inner vessel is suspended on the slab by a perforated cylindrical ferrule extending upwards of said large diameter ferrule. In this case, the perforated cylindrical ferrule and the main vessel can be suspended on the slab by a single cylindrical ferrule or both can be suspended directly on the slab. According to another variant of the invention, the inner vessel rests on the bottom of the main vessel by means of a support ferrule.

According to a special embodiment of the invention, the pumps are suspended on the slab and traverse the upper truncated cone-shaped ferrule in order to communicate by pipes with a supply support member of the core constituting part of the support structure.

According to the variant in which the inner vessel is supported on the main vessel, the pumps are placed in the passages or shafts sealingly traversing the two truncated cone-shaped ferrules.

In a comparable manner, the upper truncated cone-shaped ferrule supports shafts or passages containing hot liquid metal and the exchangers are suspended on the slab disposed in said shafts or passages and traverse the lower truncated cone-shaped ferrules to issue into the cold zone. If necessary, the inner vessel can be duplicated over its entire height by a thermal baffle.

However, in view of the shape of the inner vessel according to the invention, said baffle can be eliminated or limited to the lower part of the inner vessel incorporating the lower truncated cone-shaped ferrule and optionally the large diameter cylindrical ferrule, the upper edge of the baffle being overhung by a sealing bell carried by the inner vessel.

BRIEF DESCRIPTION OF THE DRAWINGS

The invention is described in greater detail hereinafter relative to non-limitative embodiments and with reference to the attached drawings, wherein show.

DETAILED DESCRIPTION OF THE INVENTION

Figure 1A:
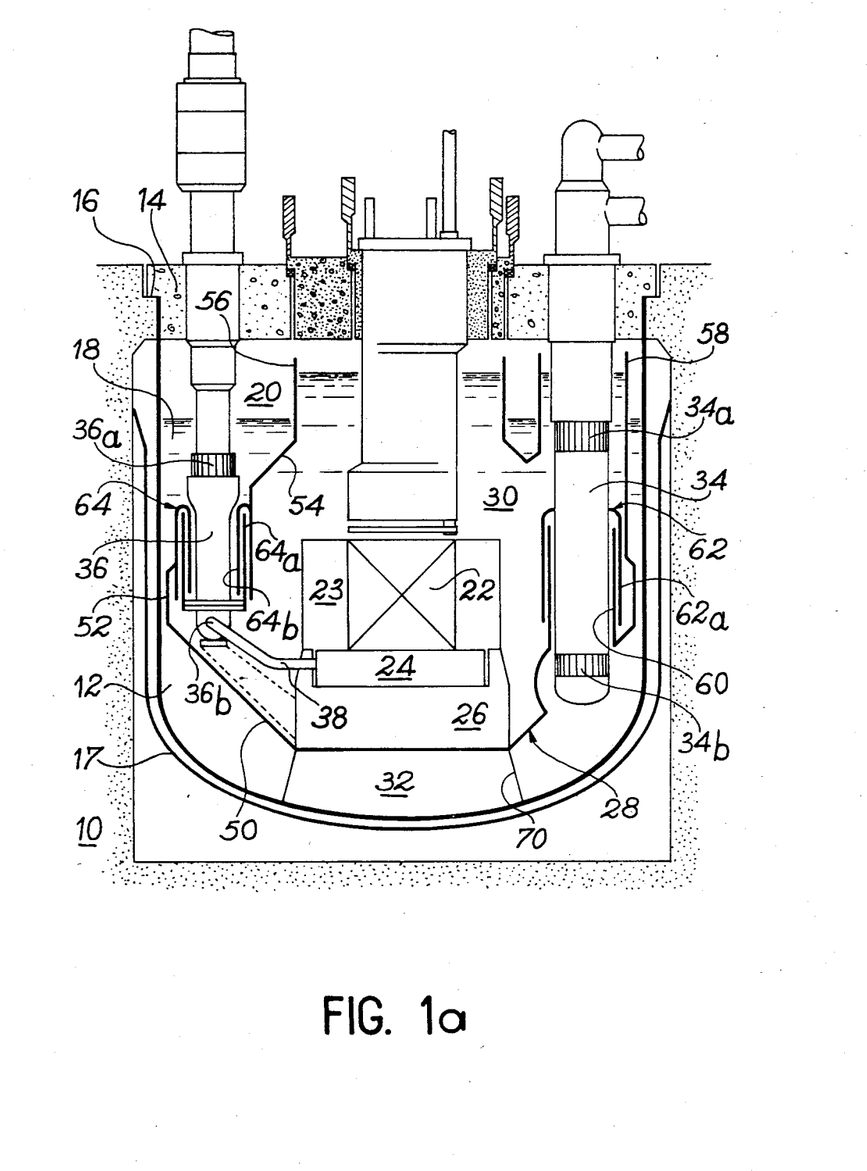
FIGS. 1a and 1b, diagrammatic sectional views of two embodiments of the primary circuit of an integrated fast neutron reactor according to the invention.
Figure 1B:
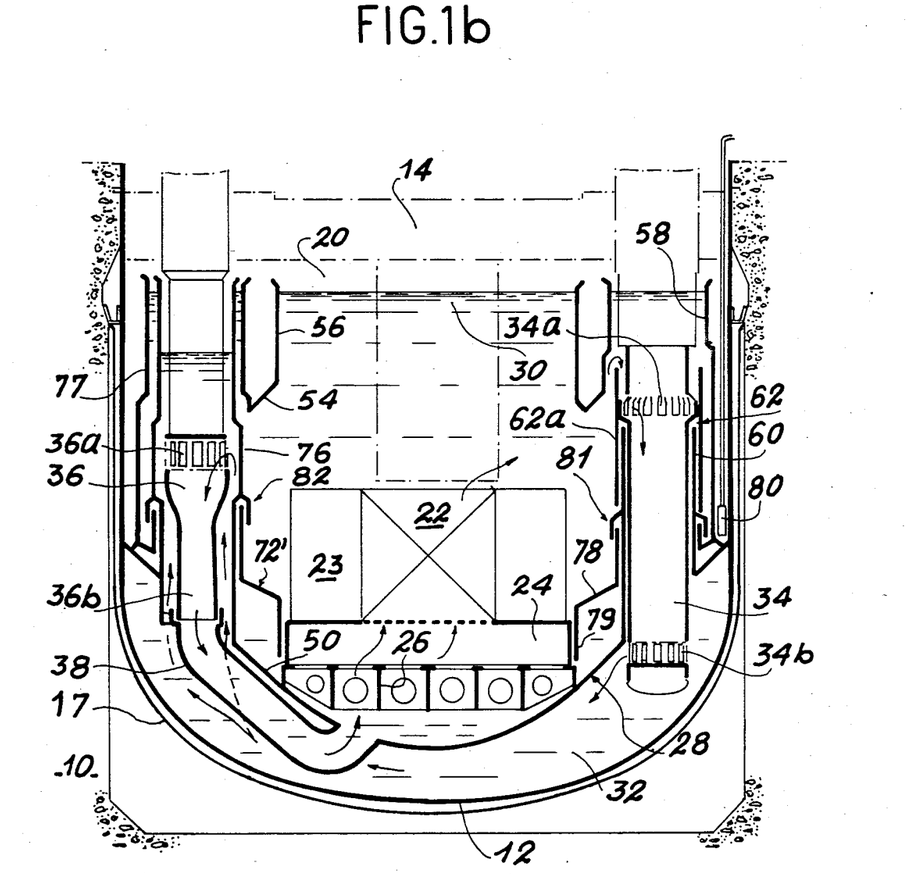

As illustrated in FIGS. 1a and 1b, the overall concept of the reactor according to the invention is in accordance with that of integrated fast neutron nuclear reactors.

Thus, the reactor shown in FIGS. 1a and 1b comprises a concrete reactor building defining a vessel well 10 in which is located a main vessel 12 having a vertically axed cylindrical configuration. Vessel 12 is sealed at its upper end by a concrete slab 14, whose peripheral edge rests on an annular bearing 16 defined in the upper part of the vessel well 10. For safety reasons, the main vessel 12 is duplicated by a safety vessel 17. The main vessel 12 is filled with liquid sodium 18 over which, in the vicinity of slab 14, is provided a covering of a neutral gas 20 such as argon.

The main vessel 12 also contains the reactor core 22. In known manner, the reactor core is constituted by fertile combustible assemblies and is surrounded by a neutron protection 23. Core 22 and its neutron protection 23 rest on a support member 24 supporting the core and its liquid sodium supply. Support member 24 rests on plating 26 supporting the core-support member assembly.

The integrated primary circuit shown in FIGS. 1a and 1b also comprises an inner vessel 28 making it possible to separate the sodium 18 contained in the main vessel 12 into a hot zone or hot collector 30 defined within vessel 28 and containing relatively hot sodium from reactor core 22 and a cold zone or cold collector 32 formed between vessels 12 and 28 and containing relatively cold sodium from the heat exchangers 34. In exchangers 34, part of the heat extracted from the reactor core by the primary sodium 18 is transmitted in per se known manner to one or more secondary sodium circuits (not shown) arranged within the main vessel 12. The exchangers 34 have inlets 34a, linked with the hot zone 30 and outlets 34b linked with the cold zone 32.

The circulation of sodium 18 between cold zone 32 and hot zone 30 through core 22 and conversely between hot zone 30 and cold zone 32 through exchangers 34 is controlled by pumps 36 placed in exchangers 34 and the complete primary circuit within the main vessel 12.

In order to circulate the sodium, the pumps 36 have suction orifices 36a, which are linked with the cold zone 32 and discharge orifices 36b linked with the supply support member 24 of core 22 by pipes 38. Although FIGS. 1a and 1b only show a single exchanger 34 and a single pump 36, several of these components are generally provided within the main vessel 12 of the same reactor.

In known manner and as shown in FIGS. 1a and 1b, the exchangers 34 and pump 36 are suspended on slab 14 and disposed in the peripheral region of main vessel 12 surrounding core 22.

According to the invention and as shown in FIGS. 1a and 1b the inner vessel 28 has an original shape and which is also particularly simple which, compared with the known reactors, makes it possible to eliminate certain parts and significantly simplify the other parts.

Thus, in the case of the embodiment of FIG. 1A, starting from the bottom, inner vessel 28 comprises a first truncated cone-shaped ferrule 50, whereof the small base is turned downwards, a small diameter cylindrical ferrule 52, a second truncated cone-shaped ferrule 54, whose small base is turned upwards and a small diameter cylindrical ferrule 56. In a not shown variant, the large diameter cylindrical ferrule 52 can be eliminated, the ferrules 50 and 52 then being directly connected to one another by their large base. In both these cases, there is still an annular passage between inner vessel 28 and main vessel 12, in such a way that the cold collector 32 has a part located above the ferrule 54 and into which issues the suction orifices 36a of the pumps.

Moreover, in the embodiment of FIG. 1a, the lower ends of the pumps having the discharge orifices 36b are positioned slightly above the lower truncated cone-shaped ferrule 50, so that there is no need to give the latter a complex shape at this level or have pipes 38 passing through the inner vessel.

In order to ensure the insulation between the hot and cold zones at pumps 36, whilst taking account of the differential expansions between the inner vessel 28 and the pumps, it can also be seen from FIG. 1a that sealing bells 64 (e.g. of the argon bell type) are provided between the upper truncated cone-shaped ferrule 54 and the pumps. More specifically, each of the sealing bells 64 is formed between a ferrule 64a integral with the discharge pipe 38 and extending in the upwards direction and a reversed U-shaped ferrule 64b fixed to ferrule 54 and overlapping the upper edge of ferrule 64a.

In a not shown variant, these functions can also be fulfilled by a single ferrule fixed by its ends to the pump diffuser and to the upper truncated cone-shaped ferrule and equipped with an expansion bellows.

In view of the need to provide an exchange length of an adequate nature within the exchangers 34, their inlets 34a are positioned above ferrule 54 and communicate with the hot zone 30 as a result of the presence of passages or shafts 58 fixed to ferrule 54 and surrounding the exchangers 34 above the latter.

Moreover, the exchanger outlets 34b are located above the median part of the lower truncated cone-shaped ferrule 50 and issue into the cold zone 32 partly by means of a second passage 60 fixed to ferrule 50 and surrounding the exchanger 34 located above the same. The sealing between the hot zone and the cold zone is brought about at the upper edge of ferrule 60 by a sealing bell 62 (e.g. an argon bell). Thus, a ferrule 62a is fixed to exchanger 34 above the upper edge of ferrule 60 and is extended downwards around the latter.

The reactor core 12 is no longer directly supported by the main vessel via support member 24 and plating 26 as in existing structures and is instead supported by the inner vessel 28. More specifically, plating 26 rests directly on the small base of the lower truncated cone-shaped ferrule 50, as illustrated by FIG. 1a.

Figure 2A:
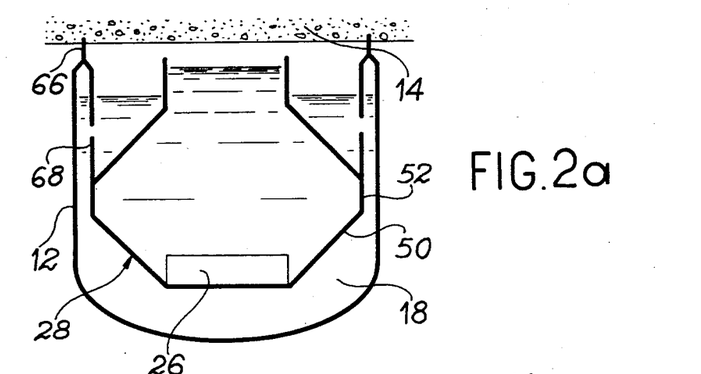
FIGS. 2a, 2b, 2c, 2d and 2e, diagrammatically variants of the supporting of the inner vessel of the reactor according to the invention.
Figure 2B:
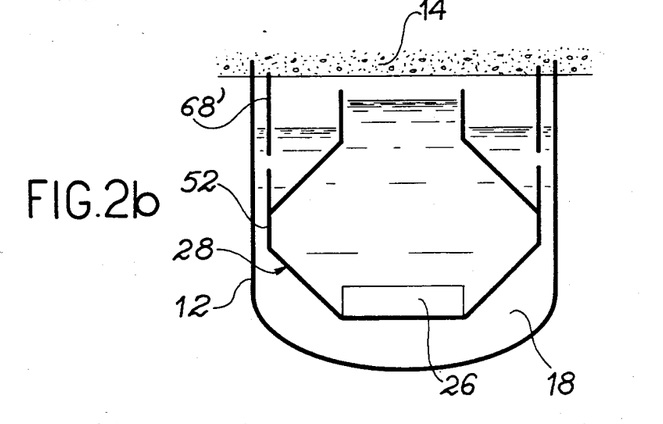
Figure 2C:
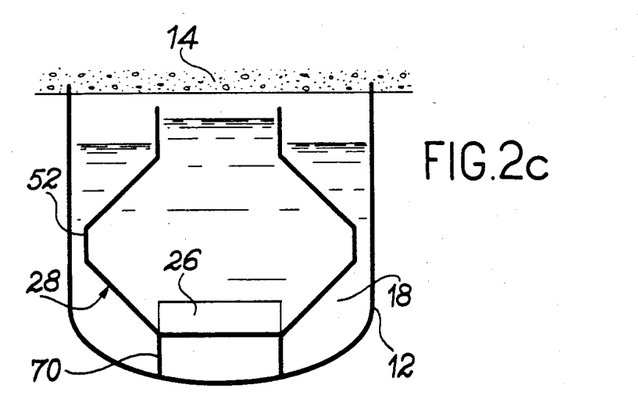

FIGS. 2a, 2b and 2c show different supporting modes for the inner vessel 28 applied to the embodiment described hereinbefore with reference to FIG. 1a.

Thus, as illustrated in FIG. 2a the main vessel 12 and inner vessel 28 can both be connected to a cylindrical ferrule of the common vessel 66, itself being suspended on the reactor slab 14. This connection then has an inverted Y-shaped cross-section and the inner vessel 28 is connected to vessel 66 by a perforated cylindrical ferrule 68 extending upwards the large diameter cylindrical ferrule 52 of the inner vessel.

This first solution makes it possible to separate the support function of the core (fulfilled by the inner vessel) and the sodium retention function (fulfilled by the main vessel).

In the solution of FIG. 2b, each of the vessels 12 and 18 is directly suspended on the slab independently of one another. Thus, the large diameter cylindrical ferrule 52 of inner vessel 28 is extended upwards by a perforated ferrule 68' directly fixed to slab 44.

In the solution of FIG. 2c and also shown in FIG. 1a, the inner vessel 28 rests on the bottom of the main vessel 12 via a support ferrule 70 extending downwards the plating 26 and transmitting all the load to the main vessel via a triple point. In this solution, the lower truncated cone-shaped ferrule 50 is mechanically lightened to the detriment of the main vessel 12. Moreover, the replacement of the perforated ferrule 68 or 68' by ferrule 70 leads to a weight increase which can reach 100 tonnes.

In the embodiment of FIG. 1b, the inner vessel 28, starting from the bottom, comprises a first truncated cone-shaped ferrule 50, whereof the small base is turned downwards, a second truncated cone-shaped ferrule 54, whose small base is turned upwards and a small diameter cylindrical ferrule 56.

More specifically, the upper ferrule 54 is fixed by its large base to the lower ferrule 50, in the vicinity of the large base thereof, by which the inner vessel 28 is then directly fixed to the main vessel 12. This supporting mode is very diagrammatically shown in FIG. 2d.

Figure 2D:
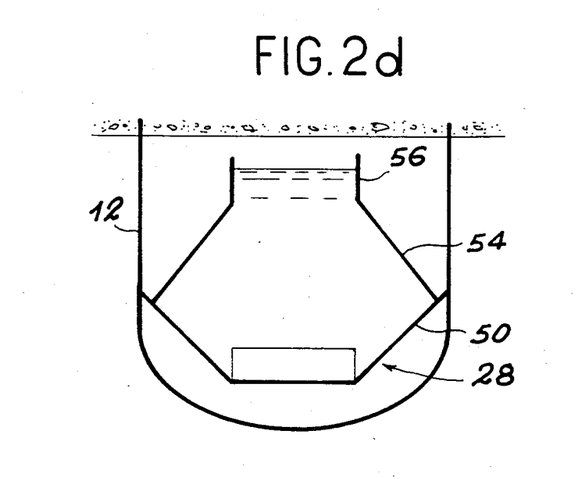
Figure 2E:
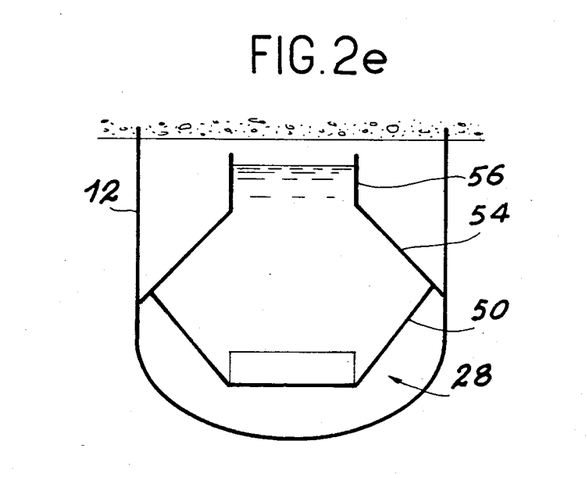

In a variant of this second embodiment of the invention shown very diagrammatically in FIG. 2e, the arrangement is reversed, i.e. it is the lower truncated cone-shaped ferrule 50 which is connected by its large base to the upper truncated cone-shaped ferrule 54 in the vicinity of the large base of the latter, by which the inner vessel 28 is then directly fixed to the main vessel 12.

As illustrated in FIGS. 1b, 2d and 2e, this embodiment mainly differs from the previous embodiment by the fact that the sodium contained in the cold collector 32 is confined below the lower truncated cone-shaped ferrule, 50. Thus, the annular space surrounding ferrules 54 and 56 is filled with argon 20, in the same way as the space overhanging the hot collector 30. The sodium which condenses in the space is removed by a draining pump 80 fixed to slab 54 and dropping to the vicinity of lower ferrule 50.

This solution makes it possible to reduce the total sodium mass and eliminate the thermal stresses at the point where the main vessel 12 is fixed to slab 14.

Bearing in mind this feature, it is no longer possible as in the embodiment of FIGS. 1a, to suck cold sodium through orifices 36a of the pumps directly above the upper truncated cone-shaped ferrule 54. Thus, it can be seen in FIG. 1b that the pumps 36 are located in passages 76, tightly fixed to the lower ferrule 50 and rising to above the free level of the sodium contained in hot collector 30. Moreover, in order to ensure the confinement of the sodium within the hot collector, whilst taking account of possible differential expansions between the ferrule 54 and passage 76, the latter is surrounded, above ferrule 54, by a second passage 77 rising to the same level as passage 76. Thus, the liquid sodium in the hot collector is admitted into the annular space formed between passages 76 and 77.

Moreover, it can be seen in FIG. 2b that the pipes 38 connecting the discharge or backflow orifices 36b to support member 24 are placed in the cold collector 32 below the lower truncated cone-shaped ferrule 50.

Conversely, the passage of the inner vessel 28 by exchangers 34 can be realised in the same way as in the first embodiment. Thus, in FIG. 1b, there is once again a passage 58 tightly fixed to the upper ferrule 54 and containing hot sodium, as well as the sealing bell 62 formed between a ferrule 60 fixed to the lower ferrule 50 and a ferrule 62a fixed to the exchanger. As shown in FIG. 1b ferrule 62a can be extended upwards beyond the inlets 34a to form a baffle regularizing the outflow of sodium at the exchanger intake (a similar arrangement can be adopted in FIG. 1a).

FIG. 1b also shows a special arrangement which can also be applied to the embodiment of FIG. 1a, according to which a supplementary truncated cone-shaped ferrule 78 is placed within the inner vessel 28 and is fixed thereto in the vicinity of the large bases of ferrules 50 and 54. This ferrule 78 is extended around the support member 24 by a cylindrical ferrule 79, so as to isolate a static sodium zone between the ferrules 50, 78 and 79. Thus, ferrules 78 and 79 constitute a thermal baffle 72'. The sealing between ferrule 78 and the ferrules or passages 60 and 76 can more particularly be obtained by means of sealing bells 81 and 82 respectively, e.g. of the argon bell type.

As a result of the dimensions of the various ferrules constituting the inner vessel 38 according to the invention, the passage of sodium 18 between hot zone 30 and cold zone 32 by means of exchangers 34 and pumps 36 can take place, without it being necessary to add to the inner vessel numerous complicated parts.

Moreover, the special shape of the inner vessel 28 according to the invention makes it possible to incorporate exchangers 34 into the primary sodium circuit, without it being necessary to connect these components to the inner vessel by complexly shaped connecting structures, as was the case in integrated fast neutron reactors having a cylindrical inner vessel.

Figure 3A:
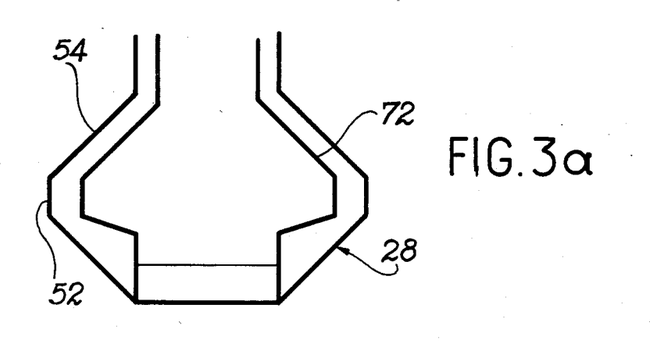
FIGS. 3a, 3b and 3c diagrammatically, three constructional variants of the invention which can be combined at random with the variants of FIGS. 2a to 2e and relating to the possible presence of a baffle within the inner reactor vessel.

As illustrated in FIG. 3a, the inner vessel 28 can be completely internally duplicated by a thermal baffle 72. It should be noted that such a baffle exists in existing solutions having a stepped inner vessel. Apart from its thermal insulation function, it improves the mechanical characteristics of the inner vessel.

With respect to the latter point, it should be noted that the shape of the inner vessel according to the invention is such that the upper part of baffle 72 is not necessary for the mechanical strength of the upper truncated cone-shaped ferrule 54. Thus, the shape of this ferrule is such that the stresses due to pressure are partly compensated by its own weight. The truncated cone-shaped ferrule 54 is consequently mechanically less loaded than the part of the baffle 72 which protects it. Thus, the sole interest of the upper part of the baffle is its thermal insulation function. Thus, if the leakage heat flow through the upper baffle 54 is acceptable, the upper part of the baffle can be eliminated. If this is not the case, said upper baffle part can be replaced by submerged thermal insulation.

Figure 3B:
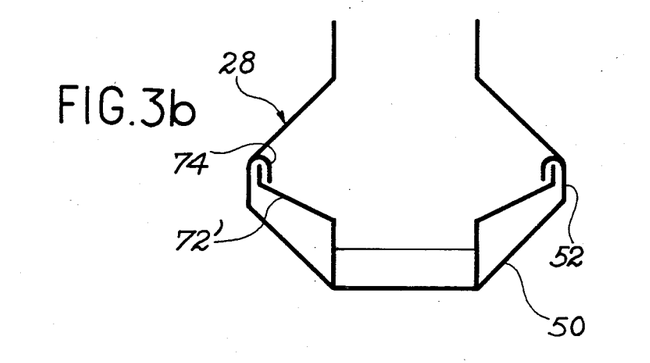

FIG. 3b shows the case in which only the large diameter cylindrical ferrule 52 and the lower truncated cone-shaped ferrule 50 of the inner vessel are duplicated by a baffle 72'. In this case and comparable to that described hereinbefore relative to FIG. 1b, the sealing between the free upper edge of baffle 72' and the inner vessel 28 can be realised by means of a sealing bell 74 (e.g. an argon bell).

Figure 3C:
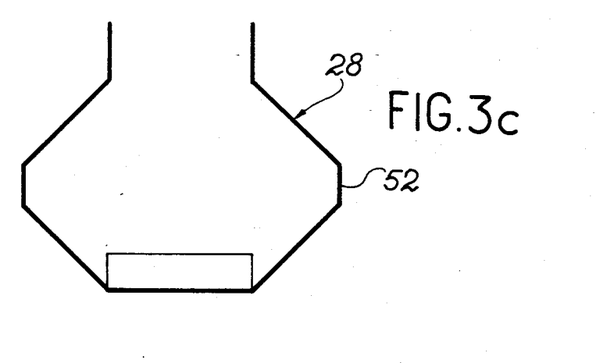

Moreover, it should be noted that the lower truncated cone-shaped ferrule 50 is not in direct contact with the hot sodium leaving the reactor core, but is in contact with the stagnant sodium and is consequently less hot, so that the presence of a baffle in the vicinity of said ferrule is not absolutely necessary. Thus, the baffle can be completely eliminated, as shown in FIG. 3c. This solution is particularly appropriate in case of FIG. 2c, in which the inner vessel 28 rests on the main vessel 12 in such a way that the lower truncated cone-shaped ferrule 50 is only slightly mechanically loaded.

Obviously, the partial elimination or total elimination of the baffle duplicating the inner vessel permits a weight gain equivalent to the eliminated part. Moreover, it makes it possible to reduce the diameter of the vessel and consequently gives a supplementary weight gain with respect to certain structures (vessels, slabs, etc).

The above description shows that the internal vessel shape according to the invention leads to a significant weight gain with respect to the inner structures of the reactor and is e.g. 1000 tonnes compared with the Super-Phénix reactor.

It should also be noted that the volume of the hot zone and the free surface of the relatively hot sodium contained therein are relatively small compared with the volume and corresponding surface of the cold zone, which leads to an improved thermal efficiency.

Moreover, the structure of the inner vessel according to the invention makes it possible to immerse the core in the case of the simultaneous fracture of the main vessel 12 and the safety vessel 17. Thus, the sealing bell 62 surrounding the exchangers 34, as well as the sealing bell 62 surrounding pumps 36, are positioned slightly above the upper level of the core, so that the assemblies are not pumped out when the bottom of the inner vessel 28 remains intact.

Among the other advantages resulting from the structure according to the invention, it should be noted that the shape and manufacture of the inner vessel are facilitated, which also applies to the thermal baffle which may optionally duplicate the same. Moreover, in normal operation, all the structures operate under an internal pressure and have a great rigidity and good resistance to earthquakes. As a result of the invention, the plating is internally and externally irrigated by the cold sodium, the vessel bottom only withstands the static pressure of the sodium, the level of the cold sodium is lower than in the Super-Phénix and consequently the length of the vessel means is increased correspondingly. Moveover, the presence of a large free surface of relatively cold sodium leads to a large argon covering volume 20 ensuring a good thermal insulation and reducing the heat gradients at the upper walls of the main vessel. These conditions are further improved in the case of the variant of FIG. 1b, because then it is argon and not sodium above the above truncated cone-shaped ferrule.

What is claimed is:

1. In a liquid metal-cooled nuclear reactor incorporating a main vessel containing a reactor core resting therein on a supply support member, a slab sealing said main vessel, an inner vessel placed within the main vessel and defining in the latter a hot zone filled with relatively hot liquid metal and a cold zone filled with relatively cold liquid metal, at least one pump for circulating the liquid metal between the cold zone and the hot zone across the core and at least one heat exchanger disposed between the hot zone and the cold zone, said pump and said exchanger being suspended on the slab, wherein the inner vessel comprises an upper and a lower truncated cone-shaped ferrule each having a large base oppposedly supported and a small diameter cylindrical ferrule extending the small base of the upper truncated cone-shaped ferrule, the reactor core resting on the small base of the lower truncated cone-shaped ferrule by means of a support structure, the hot zone being formed within the inner vessel, the cold zone being formed between the main vessel and the inner vessel, each pump sealing traversing the upper truncated cone-shaped ferrule and having sucking orifices opening in the cold zone and discharge orifices communicating with said supply support member through at least one pipe, and each heat exchanger sealingly traversing both the upper and lower truncated cone-shaped ferrules and having inlets opening in the hot zone above the lower truncated cone-shaped ferrule and outlets opening in the cold zone below the lower truncated cone-shaped ferrule.

2. A reactor according to claim 1, wherein the lower truncated cone-shaped ferrule supports at least one passage extending upwards through the upper truncated cone-shaped ferrule, the inside of each passage forming a part of said cold zone, each pump being placed within one of said at least one passage and having its sucking orifices opening within said passage, said at least one pipe sealingly traversing the lower truncated cone-shaped ferrule.

3. A reactor according to claim 2, wherein the cold zone is limited by the bottom of the main vessel, the lower truncated cone-shaped ferrule and the inside of the passage in which each pump is placed.

4. A reactor according to claim 1, wherein each pump sealingly traverses the upper truncated cone-shaped ferrule by means of a sealing bell whose level is above the top level of the cone, each pump and the corresponding pipe being positioned above the lower truncated cone-shaped ferrule.

5. A reactor according to claim 1, wherein the upper truncated cone-shaped ferrule supports at least one passage extending upwards, the inside of each passage forming a part of said hot zone, each exchanger being disposed in one of said at least one passage and having its inlets opening within said passage.

6. A reactor according to claim 5, wherein each exchanger sealingly traverses the lower truncated cone-shaped ferrules by means of a sealing bell, whose level is above the top level of the core.

7. A reactor according to claim 1, wherein the upper truncated cone-shaped ferrule is connected by its large base to the lower truncated cone-shaped ferrule, in the vicinity of the large base thereof.

8. A reactor according to claim 1, wherein the lower truncated cone-shaped ferrule is connected by its large base to the upper truncated cone-shaped ferrule, in the vicinity of the large base thereof.

9. A reactor according to claim 1, wherein the two truncated cone-shaped ferrules are directly interconnected by their large bases.

10. A reactor according to claim 1, wherein the two truncated cone-shaped ferrules are connected along their large bases by means of a cylindrical ferrule.

11. A reactor according to claim 1, wherein the lower truncated cone-shaped ferrule is tightly connected by its large base to the main vessel, pumping means being located in the space formed just above the tight connection.

12. A reactor according to claim 1, wherein the upper truncated cone-shaped ferrule is tightly connected by its large base to the main vessel, pumping means being provided in the space formed just above this tight connection.

13. A reactor according to claim 1, wherein the inner vessel is suspended on the slab by a perforated cylindrical ferrule upwardly extending the said large diameter ferrule.

14. A reactor according to claim 13, wherein the perforated cylindrical ferrule and the main vessel are suspended on a single cylindrical ferrule, which is itself suspended on the slab.

15. A reactor according to claim 13, wherein the perforated cylindrical ferrule is directly suspended on the slab.

16. A reactor according to claim 1, wherein the inner vessel rests on the bottom of the main vessel by means of a support ferrule.

17. A reactor according to claim 1, wherein the inner vessel is duplicated over its entire height by a thermal baffle.

18. A reactor according to claim 1, wherein only the lower part of the inner vessel is duplicated by a thermal baffle, whose upper edge is overhung by a sealing bell carried by the inner vessel.

* * * * *